United States Patent [19]
Kanamaru et al.

[11] 3,933,646
[45] Jan. 20, 1976

[54] REVERSE OSMOSIS SEPARATION APPARATUS

[75] Inventors: Naokatsu Kanamaru, Kyoto; Hisaaki Fujino, Otsu, both of Japan

[73] Assignee: Toray Industries, Inc., Tokyo, Japan

[22] Filed: May 9, 1974

[21] Appl. No.: 468,545

[30] Foreign Application Priority Data
May 14, 1973  Japan............................ 48-52573

[52] U.S. Cl. ..... 210/321 R; 210/433 M; 210/494 M
[51] Int. Cl.² ......................................... B01D 31/00
[58] Field of Search ............ 210/321, 433, 487, 494

[56] References Cited
UNITED STATES PATENTS

| | | | |
|---|---|---|---|
| 2,833,413 | 5/1958 | Fohtein........................... | 210/494 X |
| 3,397,790 | 8/1968 | Newby et al..................... | 210/494 X |
| 3,813,334 | 5/1974 | Bray................................ | 210/494 X |

Primary Examiner—Frank A. Spear, Jr.
Attorney, Agent, or Firm—Haseltine, Lake & Waters

[57] ABSTRACT

There is provided an improvement of a reverse osmosis separation apparatus in that a membrane module or a permeator has spiral passages for a feed solution and a permeated solution respectively, those passages being formed with membrane sheets about a hollow mandrel to allow the feeding solution to flow spirally on a plane perpendicular to the axis of the mandrel thereby performing with a high recovery ratio and preventing the feed solution from passing through the feed solution passage in an unequally distributed flow state, which decreases rejection of the solution. The improved apparatus has a reinforced module in which the spiral sheets are held together with the mandrel in a rigid state by means of sealing members forming the opposite ends of the module thereby preventing the spiral sheets from being subjected to telescoping or axial deformation which results in damage to the membrane sheets.

4 Claims, 10 Drawing Figures

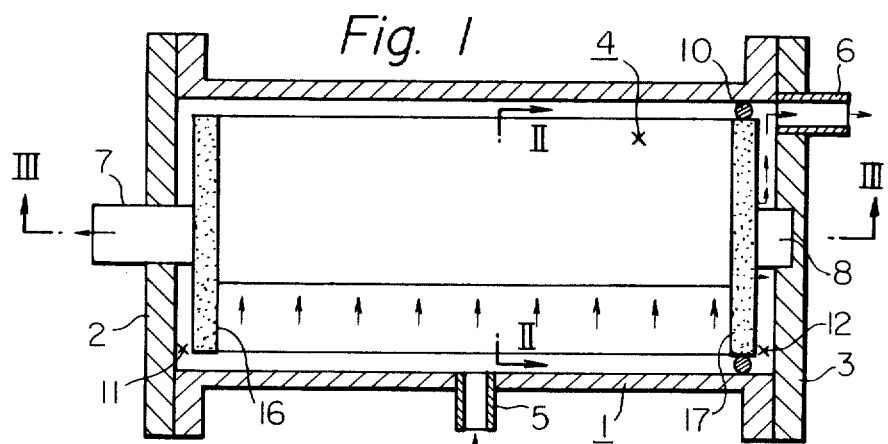
Fig. 1
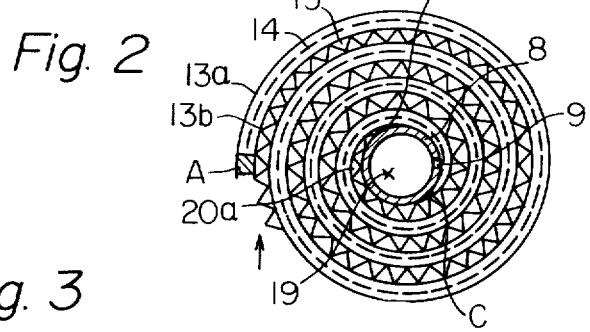
Fig. 2
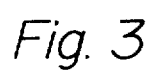
Fig. 3
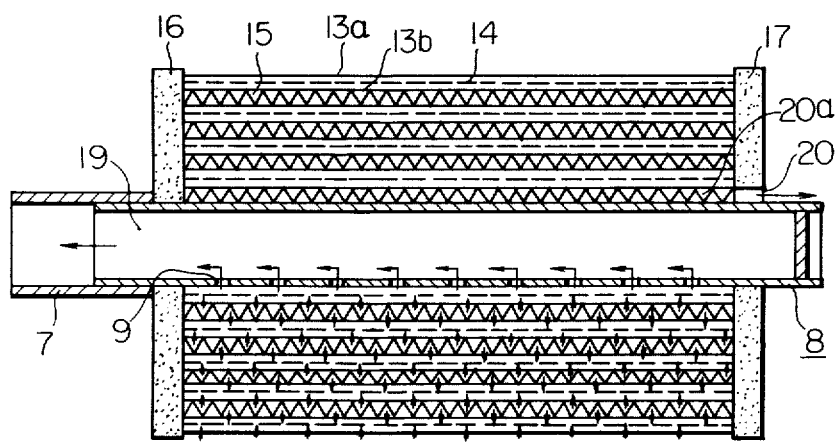

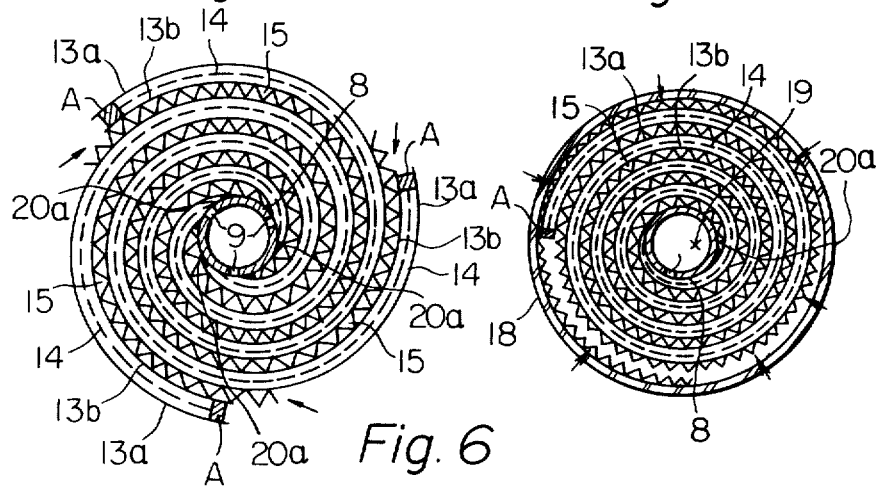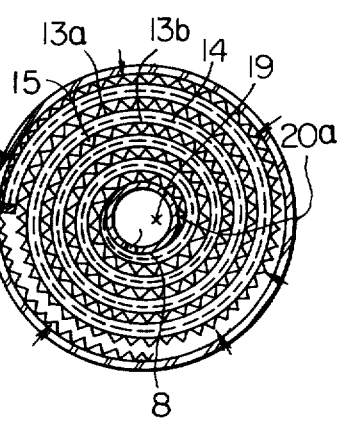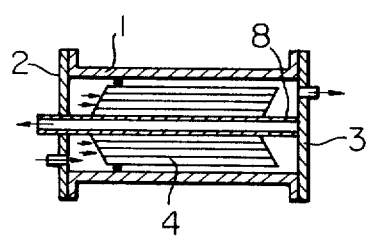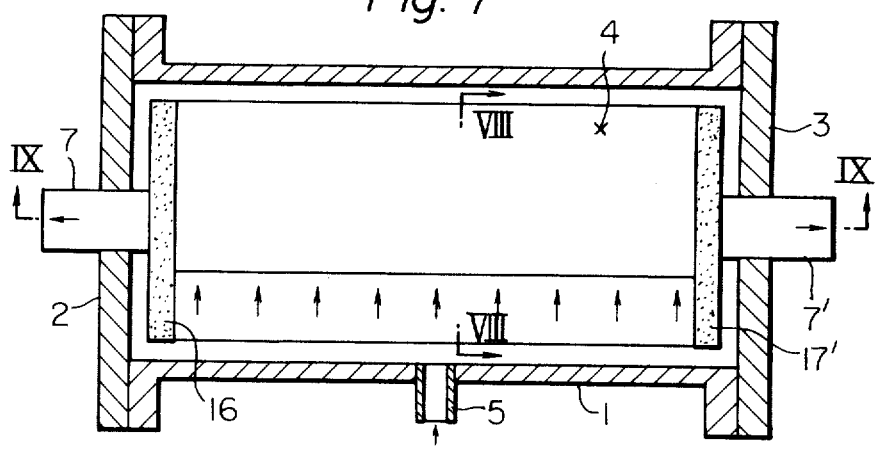

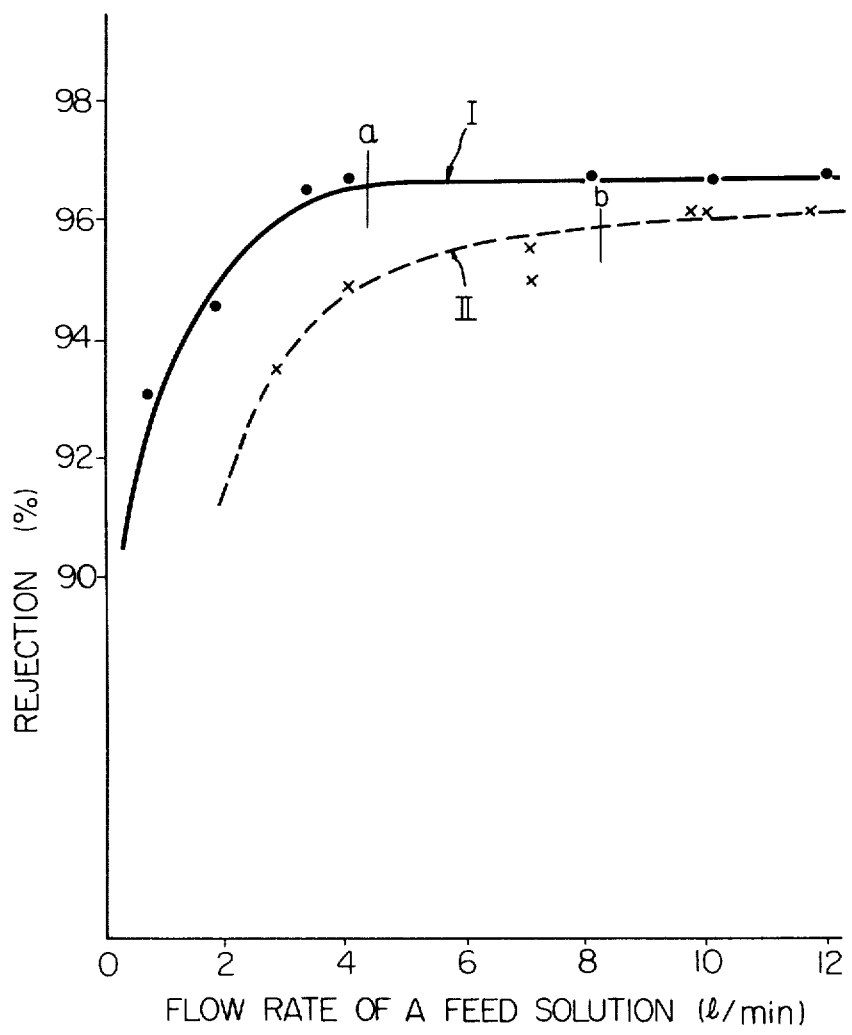

REVERSE OSMOSIS SEPARATION APPARATUS

The present invention relates to an improved apparatus for effectively separating a desired liquid component from a feed solution, utilizing the principle of reverse osmosis.

Various liquid separation apparatuses employing reverse osmosis membranes have been proposed. These apparatuses may be a tube type, a hollow fiber type or a spiral type. As for the spiral type apparatus, for example, the specification of U.S. Pat. No. 3,367,504 discloses a reverse osmosis separation apparatus comprising a cylindrical chamber and a module having a hollow mandrel with two sheets of reverse osmosis membranes spirally wound about the hollow mandrel in an arrangement such that a first passage for a permeated solution communicating with the interior of the hollow mandrel is formed between the inside surfaces of the two membrane sheets and a second passage for a feeding solution is formed between the outside surfaces of the two membrane sheets, wherein the feed solution is forced to flow from the spiral edges of the membrane sheets through the second passage in a direction parallel to the axis of the mandrel, while the permeated liquid from the feed solution passes through the membrane sheets into the first passage by reverse osmosis and flows spirally through the first passage, and then is discharged from the first passage into the hollow mandrel.

The disadvantage of the above-mentioned apparatus is that it performs with a relatively low recovering ratio. Further, the apparatus has inherent problems in that the sectional area of the feed solution passage varies considerably owing to the fluid pressure of the feed solution and thus, the flow velocity varies on a plane orthogonal to the axial direction. This results in an unequally distributed fluid flow in the passage, and produces the phenomenon of polarized concentration. Such a phenomenon decreases rejection which is a performance of the module. In order to avoid unequal distribution of the flow, a considerably complicated design of the apparatus is required with the result that the apparatus presents difficulty in fabrication.

Further, the specification of U.S. Pat. No. 3,173,867 discloses another reverse osmosis separation apparatus of a spiral type, wherein a feed solution is forced to flow spirally along the surfaces of membrane sheets wound spirally about a hollow mandrel and the permeated solution is forced to flow along the opposite surfaces of the membrane sheets in the axial direction of the mandrel. It is noted that, although the secondly mentioned apparatus has the advantage of a high recovery ratio in comparison with the first mentioned apparatus, is has the disadvantage of being so complicated an arrangement that it presents difficulty in fabrication.

Therefore, an object of the present invention is to provide an improvement of the reverse osmosis separation apparatus, which avoids the disadvantages of the prior art apparatuses, and has an increased rejection by preventing polarized concentration resulting from the unequally distributed flow of the solution, while a high recovery ratio is ensured.

The module employed in the conventional apparatus presents difficulty in fabrication, and/or has the disadvantage of being easily deformable. The deformation of the mandrel is referred to as telescoping. It is noted that the tendency to telescope occurs not only during operation of the apparatus but also at the time when the module is mounted in or is removed from the chamber. Further telescoping easily occurs during the construction process of the module. The occurrence of telescoping is accompanied by deformation and consequent damage of the thin membrane sheet. Since damage or breakdown of the membrane sheet causes the apparatus to perform with a considerably decreased rejection, it is obviously desirable to prevent the occurrence of the telescope phenomenon.

A second object of the present invention is to provide a simple arrangement of a reverse osmosis separation apparatus comprising a cylindrical chamber with a reinforced module having a hollow mandrel and reverse osmosis membrane, which prevents telescoping which occurs often in the conventional apparatus. Therefore, according to the present invention, production of the module and combination of the module with the chamber become simple and easy and avoidance of damage to the membrane sheets is ensured.

In one aspect of the present invention, there is provided a reverse osmosis separation apparatus comprising a cylindrical chamber; a membrane module disposed with its axis coaxial to the axis of the chamber, the module comprising a hollow mandrel having a hole or axially aligned holes on its outer circumference and a pair of membrane sheets spaced apart from each other by spacing layers and spirally wound about the mandrel to form a first spiral passage for a permeated solution between the opposite inner surfaces of the sheets and to form a second spiral passage for a feed solution between the opposite outer surfaces of the sheets. The first passage is closed at the outer edges of the entire lengths of the sheets and has an outlet opening elongated in the axial direction at the inner edges of the entire lengths of the sheets to communicate with the interior of the mandrel through the hole thereof, and the second passage has an inlet opening elongated in the axial direction at the outer edges of the entire lengths of the sheets and an axial outlet opening at the spiral edges of the sheets in the vicinity of the surface of the mandrel. The first and second passage are closed at the opposite spiral edges of the sheets over the spiral lengths except foor the partial length where the axial outlet opening is formed. Means are provided for supplying the feed solution into the chamber to allow it to flow into the second passage from the inlet opening thereof in a direction perpendicular to the axis; means for discharging the nonpermeated solution having flowed out through the axial outlet opening of the second passage from the chamber and means for discharging the permeated solution having flowed into the interior of the mandrel from the chamber are also provided. In the apparatus, the feed solution under increased pressure passes spirally through the second passage in contact with the sheets on a plane perpendicular to the axis, while a solution having a concentrated solvent permeates fromthe feed solution by reverse osmosis through the sheets into the first passage. The resultant solution having a concentrated solute, that is, the nonpermeated solution, flows axially along the surface of the mandrel through the second passage and flows out of the axial outlet opening of the second passage while the permeated solution flows into the interior of the mandrel.

In another aspect of the present invention, there is provided a reverse osmosis separation apparatus comprising a cylindrical chamber and a membrane module disposed with its axis coaxial to the axis of the chamber, the module comprising a hollow mandrel having first and second holes or axially aligned holes and the first and second separated zones in the interior thereof communicating with the first and second holes, respectively and a pair of membrane sheets spaced apart from each other by spacing layers and spirally wound about the mandrel to form a first spiral passage for a permeated solution between the opposite inner surfaces of the spiral sheets and to form a second spiral passage for a feed solution between the opposite outer surfaces of the spiral sheets. The first passage is closed at the upper edges of the entire lengths of the spiral sheets and has an outlet opening elongated in the axial direction at the inner edges of the entire lengths of the spiral sheets to communicate with the first interior zone of the mandrel through the corresponding hole thereof, the second passage having an inlet opening elongated in the axial direction at the outer edges of the entire lengths of the spiral sheets and an outlet opening elongated in the axial direction at the inner edges of the entire lengths of the spiral sheets to communicate with the second interior zone of the mandrel through the corresponding hole thereof, the first and second passages being closed at the opposite spiral edges of the sheets over the spiral lengths respectively. Means are provided for supplying the feed solution into the chamber to allow it to flow into the second passage from the inlet opening thereof in a direction perpendicular to the axis; means for discharging the nonpermeated solution having flowed into the second interior zone of the mandrel from the chamber, and means for discharging the permeated solution having flowed into the first interior zone of the mandrel from the chamber are also provided. In the present apparatus, the feed solution under increased pressure passes spirally through the second passage in contact with the sheets on a plane perpendicular to the axis, while a solution having a concentrated solvent is permeated from the feed solution by reverse osmosis into the first passage through the sheets. The resultant solution having a concentrated solute, i.e., the nonpermeated solution, flows from the outlet opening of the second passage into the second interior zone of the mandrel through the second hold of the mandrel, while the permeated solution flows from the outlet opening of the first passage into the first interior zone of the mandrel through the first hole of the mandrel.

The feature of the apparatus of the present invention is that reverse osmosis is carried out through spiral membranes between which a feed solution is forced to flow spirally on a plane substantially perpendicular to the axis, and the pemeated solution is also forced to flow in the spiral direction.

The invention will be more fully described by way of examples with reference to the accompanying drawings, wherein:

FIG. 1 is a partially sectional elevated view of an embodiment of a separation apparatus according to the present invention, showing a cylindrical chamber with side covers at the opposite ends and a membrane module mounted therein;

FIG. 2 is a cross sectional view of the module, taken along the line II—II of FIG. 1, showing an embodiment of a module having a single passage for a permeated solution and a single passage for a feed solution;

FIG. 3 is an axially sectional view of the module taken along the line III—III of FIG. 1;

FIG. 4 is a cross sectional view of the module taken along the line II—II of FIG. 1, which shows another embodiment of the module, with three passages for the permeated solution and three passages for the feed solution;

FIG. 5 is a cross sectional view of a modification of the module shown in FIG. 2, which is covered with a cylindrical filter;

FIG. 6 is a sectional diagram showing the telescope phenomenon occurring in the module of the conventional apparatus;

FIG. 7 is a partially sectional elevated view of another embodiment of a separation apparatus according to the present invention, which corresponds to FIG. 1;

FIG. 10 is a graph of the flow rate of a feed solution against the rejection of the permeated solution, showing the performances of the apparatus of the present invention and the conventional apparatus by comparison.

Figure 8:
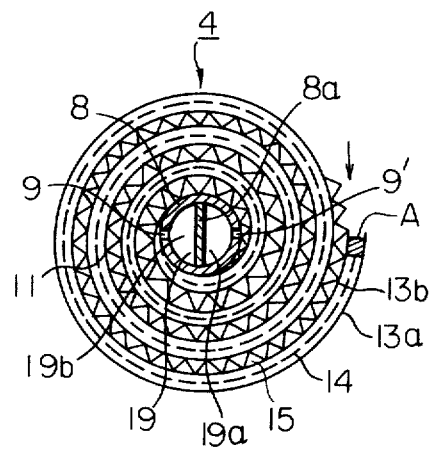
FIG. 8 is a cross sectional view of the module taken along the line VIII—VIII of FIG. 7, which corresponds to FIG. 2.

FIG. 1 shows one embodiment of the apparatus according to the invention, wherein a module 4 comprising a hollow mandrel with a closed end and an open end and membrane sheets is mounted coaxially in a cylindrical chamber 1. The opposite ends of the chamber 1 are closed with side covers 2 and 3 at its flanges. The chamber 1 is provided on its circumference with an inlet pipe 5 for a feed solution and with an outlet pipe 6 at one end for the nonpermeated solution, while the module is provided with an outlet conduit 7 connected to the open-end of the mandrel for the permeated solution. The space between the module 4 and the inner surface of the chamber 1 is divided into two zones 11 and 12 by a sealing member 10 to allow the permeated solution to be discharged out of the chamber 1 without mixing with the feed solution. The feed solution is introduced into zone 11 of the chamber 1 under sufficient pressure to carry out reverse osmosis through the inlet pipe 5 and the chamber is filled with the solution. The feed solution flows into the module 4 from its circumference over the axial length in a direction perpendicular to the axis.

FIG. 2 shows an embodiment of the module shown in FIG. 1. Referring to FIG. 2, the module 4 comprises the hollow mandrel 8 and two membrane sheets 13a and 13b. Each membrane sheet is fixed to the surface of the mandrel 8 at its edge with bonding materials B and C. The membrane sheets 13a and 13b are spaced apart from each other by a layer of porous backing material 14 therebetween and are wound spirally about the mandrel 8. A layer of porous or grid separating material 15 is disposed adjacent the membrane surfaces on the outer aspect of the backing material by being spirally wound with the membrane sheets. The sheets 13a and 13b with the backing material 14 form a spiral passage for a permeated solution. The permeated solution passage is closed with a sealing material A at the outer edges of the sheets over their axial lengths, while it is open at the inner edges of the sheets over their axial length to communicate with the interior 19 of the mandrel 8 through holes or slits 9 on the circumference of the mandrel, which are axially aligned over the length of the mandrel. The permeated solution passage is closed at the opposite spiral edges of the sheets over their spiral lengths by sealing members 16 and 17 as shown in FIGS. 1 and 3. The sealing members are made of synthetic resin. In this connection, the permeated solution is forced to flow from the passage into the interior 19 of the mandrel 8 through the holes 9 thereof.

The membrane sheets 13a and 13b with the separating material 15 form a spiral passage for the feed solution. The feed solution passage is open at the outer edges of the membrane sheets over their axial lengths to allow the feed solution to flow into the passage in a direction perpendicular to the axis, while it is closed at the inner edges of the sheets over their axial lengths by the mandrel 8. The feed solution passage is closed at the spiral edges of the sheets over the entire spiral length by the sealing member 16 while it is closed by the sealing member 17 at the opposite spiral edges of the sheets over most of the spiral lengths except for a part of the length in the vicinity of the mandrel surface. In this connection, the feed solution passage partially and axially open at the spiral edges of the membrane sheets near the mandrel surface, as indicated by numeral 20, to allow the nonpermeated solution to flow through a path 20a in the axial direction along the surface of the mandrel. The nonpermeated solution flows out of the axial outlet opening 20 into the zone 12 of the chamber 1.

In the drawings, the flow directions of the feed solution or nonpermeated solution and the permeated solution in the apparatus are indicated by arrows.

The sealing members 16 and 17 form the opposite ends of the module 4 and serve not only to prevent the feed solution from flowing into the module in the axial direction but also to hold the spiral sheets 13a and 13b and the spiral spacing layers 14 and 15 at the opposite spiral edges thereof, together with the mandrel 8, in a rigid state. The module is thus reinforced to an extent sufficient to ensure that telescoping or deformation of the spiral sheets as in the conventional apparatus shown in FIG. 6, does not occur. Therefore, the present invention completely eliminates the problem of telescoping. In FIG. 6, the same numbers as in FIG. 1 denote the corresponding members or elements.

FIG. 4 shows another embodiment of the module shown in FIG. 1, wherein three pairs of membrane sheets are spirally wound with the necessary spacing layers about a hollow mandrel in overlapping relation to form three spiral passages for the feed solution and the corresponding spiral passages for the permeated solution. Each pair formed by the feed solution passage and the permeated passage corresponds to that shon in FIG. 2 in its arrangement. The elements and members in the module shown in FIG. 4 are denoted by the same numerals as the corresponding one in the module shown in FIG. 2.

The longer the spiral length of the feed solution passage in the module, the greater the pressure loss of fluid. Therefore, in order to decrease the pressure loss of fluid, it is preferable to adopt a module as shown in FIG. 4 rather than that in FIG. 2, because the greater the number of feed solution passages provided in the module having the same dimensions, the shorter the spiral length of each passage.

FIG. 5 shows a modufied module wherein the module shown in FIG. 2 is convered circumferentially by a cylindrical filter 18. In the operation of this apparatus, the membrane sheets are generally subjected to a higher pressure than the reverse osmotic pressure of the sheets. The sheets are generally made of an organic polymer such as cellulose, polyamide or the like. Therefore, solid impurities such as rust, generated in the system including the separation apparatus, may damage the apparatus, particularly the membrane sheet. According to the present invention, since the feed solution is introduced into the module from the circumference thereof, the modified module shown in FIG. 5 is effective for preventing the kind of damage as mentioned above.

Figure 9:
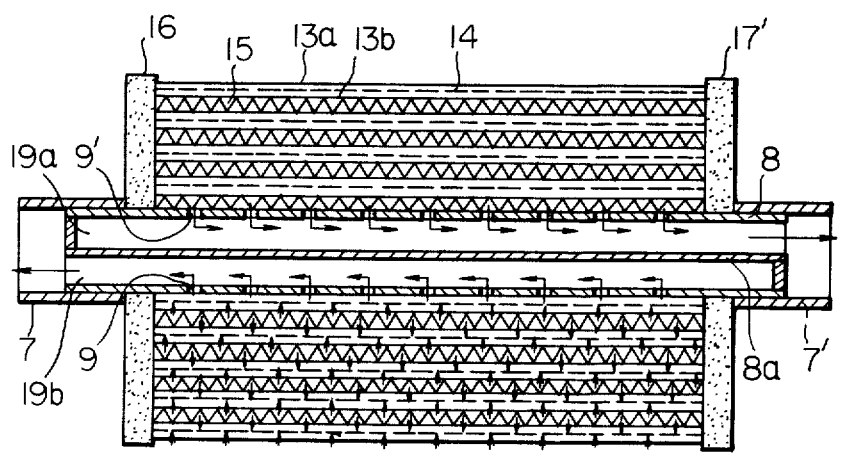
FIG. 9 is an axially sectional view of the module taken along the line IX—IX of FIG. 7, which corresponds to FIG. 3.

FIG. 7 shows another embodiment of a reverse osmosis separation apparatus according to the present invention, wherein a module is mounted coaxially in a cylindrical chamber. FIGS. 8 and 9 show the module employed in the apparatus shown in FIG. 7. In the drawings, the same numerals as in FIGS. 1, 2 and 3 denote the corresponding elements or members. The other embodiment of the apparatus has an arrangement similar to that shown in FIGS. 1, 2 and 3, except for the following. The space between the module 4 and the inner surface of the cylindrical chamber 1 is of a single zone. The interior 19 of the hollow mandrel 8 is divided by an axially longitudinal plate 8a into two zones 19a and 19b, elongated in the axial direction. At one end of the mandrel, the zone 19a is closed and the other zone 19b is open. At the opposite end of the mandrel, the zone 19a is open and the other zone 19b is closed. An outlet pipe 7 is connected to the end of the mandrel to communicate with the zone 19b, while another outlet pipe 7' is connected to the other end of the mandrel to communicate with the other zone 19a. The permeated solution passage is open at the inner edges of the membrane sheets 13a and 13b and communicates with axially aligned holes 9 on the circumference of the mandrel 8, which open to the interior zone 19b of the mandrel. The feed solution passage is open at the inner edges of the membrane sheets 13a and 13b and communicate with axially aligned holes 9' on the circumference of the mandrel 8, which open to the interior zone 19a of the mandrel. The permeated solution passage and the feed solution passage are closed at the opposite spiral edges of the sheets over the spiral lengths with sealing members 16 and 17'. The sealing member 17' has no axial output opening such as the opening 20 shown in FIG. 3. In this connection, the feed solution flows into the chamber 1 through the input conduit 5 and flows spirally into the feed solution passage of the module from the circumference thereof. The nonpermeated solution in the feed solution passage flows into the interior zone 19a of the mandrel through the hole 9' and is then discharged from the chamber 1 through the outlet pipe 7'. The permeated solution flows into the interior zone 19b of the mandrel throuh the hole 9 and is then discharged from the chamber 1 through the outlet pipe 7.

FIG. 10 shows the results of experiments involving the apparatus of the present invention and the conventional apparatus disclosed in U.S. Pat. No. 3,367,504. The experiments were carried out under the conditions that both apparatuses are made of the same materials and with the same dimensions, to be operated under the same operational conditions. An aqueous solution of 1000 ppm NaCl was supplied as a feed solution with a flow rate of 30 kg/cm$^2$ at a temperature of 25°C. The rejection shown in FIG. 10 was calculated by the following formula.

$$R = \left[1 - \frac{C_s}{(C_F + C_o)/2}\right] \times 100$$

wherein $R$: rejection in percentage,
$C_F$: concentration of solute in feed solution,
$C_O$: concentration of solute in nonpermeated solution after discharge, and
$C_S$: concentration of solute in permeated solution after discharge.

Referring to FIG. 10, it is apparent that the rejection increases when the flow rate of the feed solution increases. It is considered that this phenomenon appears due to the following. In the apparatus of the invention, the flow velocity of the feed solution passing along the surface of the membrane sheet increases when the flow rate of the feed solution increases, and the increased flow velocity promotes renewal of the feed solution layer on the surface of the membrane sheet, thereby preventing the phenomenon of polarized concentration of the solute in the feed solution.

When the flow rate increases further, rejection reaches the state of equilibrium. In the state of near equilibrium indicated by $a$ or $b$ in FIG. 10, the polarized concentration phenomenon is only slightly exhibited. In general, the separation apparatus is operated with the flow rate corresponding to approximately the above mentioned state.

It is advantageous to flow the feed solution at as low a flow rate as possible. This is because a lesser flow rate of the feed solution effects a higher recovery ratio.

Recovery ratio is defined by a ratio of a volume of the permeated solution to a volume of the feed solution. As is apparent from the results shown in FIG. 10, it is noted that, in comparing curve I representing the apparatus of the invention with curve II representing the conventional apparatus, the rejection of the apparatus of the invention reaches the state of equilibrium at a smaller flow rate than that of the conventional apparatus. From this fact, it may be proven that the apparatus of the invention performs with a higher recovery ratio than that of the conventional apparatus.

In such a module as in the apparatus of the invention or the conventional apparatus, comprising a hollow mandrel and membrane sheets spirally wound thereabout, the membrane sheet is generally considerable longer in the spiral direction in comparison with the length in the axial direction. Therefore, comparing the apparatus of the invention, wherein the feed solution is forced to flow in the spiral direction, with the conventional apparatus, wherein the feed solution is forced to flow in the axial direction, under the condition that the feed solution flows at the same flow velocity, the recovery ratio of the apparatus of the invention is higher than that of the conventional apparatus. This is because the passage area of the spiral membrane sheet is larger in the apparatus of the invention than in the conventional apparatus at the same flow velocity and thus, the flow rate of the feed solution in the former becomes lower than that of the latter.

To increase the recovery ratio, a system having a plurality of separation apparatuses in series appears to be reasonable. However, in the case where the conventional apparatus is arranged in series, a substantial increase in the recovery ratio can not be expected if the last apparatus in the series performs with a low recovery ratio. On the contrary, in the case where the apparatus of the invention is employed as the last apparatus, a high recovery ratio can be expected.

According to the invention, the apparatus has advantages in that the unequally distributed flow of the feed solution in the spiral passage is prevented and thus, the phenomenon of polarized concentration of the solute in the feed solution does not occur. From the results shown in FIG. 10, it is recognized that there is a substantial difference in the rejection in the state of near equilibrium between the apparatus of the invention and the conventional apparatus.

The difference in rejection is considered to result from the occurrence of the unequally distributed flow in the conventional apparatus, while such an unequally distributed flow does not occur in the apparatus of the invention. The difference in the rejection ranges from 1 to 2 percent. This difference may not appear to be valuable or significant. However, such a difference is greatly significant in practice, since it is between high rejection in the order of 90 percent and it registers great progress in the reverse osmosis technology.

In general, the membrane sheets and the spacing layers wound spirally about the mandrel have tensions of lower values at the areas near the mandrel than those at the areas near the circumference of the module. In some cases, the tension of the membrane sheet as well as the spacing layer may have a negative value. Therefore, in the conventional apparatus, since the feed solution is forced to flow into the module from the end thereof and to flow axially in the module, a difference in the spaces of the opposite membrane sheets between the area near the mandrel and the area near the circumference of the module is created; that is, the space at the area near the mandrel becomes larger than that at the area near the circumference. In this connection, the feed solution flows at a higher flow rate at the area near the mandrel than at the area near the circumference.

Further, variation of the sectional area of the solution passage is created due to fluid pressure, in so far as the spiral membrane sheets are not fixed. This effects an unequally distributed flow of the feed solution on the membrane sheets. On the contrary, in tha apparatus of the present invention, such an unequally distributed flow does not occur since the feed solution is forced to flow into the module from the circumference thereof and to flow spirally in the module.

In the apparatus of the invention described above, the feed solution is forced to flow into the module from the circumference thereof through the inlet 5 and is discharged from the chamber through the outlet pipe 6 or 7'. However, the feed solution can also flow in the apparatus in the reverse direction, that is, from the outlet pipe to the inlet pipe through the module, and even if the reversed flow direction is adopted, substantially the same effects as in the normal direction are obtainable.

The invention has been described in detail with particular reference to preferred embodiments thereof, but it should be understood that variations and modifications can be effected within the spirit and scope of the invention.

What we claim is:

1. In a reverse osmosis separation apparatus comprising a cylindrical chamber having a membrane module disposed with the axis thereof coaxial to the axis of said chamber, said module comprising a hollow mandrel having at least one hole at the outer circumference thereof and at least one pair of membrane sheets spaced apart from each other by spacing layers and spirally wound about said mandrel to form a first spiral passage for a permeated solution between the opposite inner surfaces of said sheets and to form a second spiral passage for a feed solution between the opposite outer surfaces of said sheets, said first passage being closed at the outer edges of the entire lengths of said sheets and having an outlet opening elongated in the axial direction at the inner edges of the entire lengths of said sheets to communicate with with the interior of said mandrel through said hole thereof, means for supplying said feed solution into said chamber to allow the solution to flow into said second passage, means for discharging the nonpermeated solution which flows out of said membrane module from said chamber, and means for discharging said permeated solution which flows into the interior of said mandrel from said chamber, the improvement comprising: said second passage having an inlet opening elongated in the axial direction at the outer edges of the entire lengths of said sheets and an axiaal outlet opening at the spiral edges of said sheets in the vicinity of the surface of said mandrel; said first and second passages being closed at the opposite edges of said sheets over most of the spiral lengths except where said axial outlet opening is formed, and; said supplying means for said feed solution being provided so that said feed solution is forced to flow transversely into said chamber in a direction perpendicular to the axis of said chamber, whereby said feed solution is forced to flow into said second passage through said inlet opening thereof and to flow spirally around said mandrel through said second passage and said nonpermeated solution is forced to flow out of said membrane module through said axial outlet opening of said second passage, said permeated solution flowing spirally in said first spiral passage and being discharged via said hole in the mandrel into the interior of said mandrel.

2. A reverse osmosis separation apparatus according to claim 1, wherein a plurality of pairs of said membrane sheets with said spacing layer are spirally wound about said mandrel in overlapping relation to form a plurality of sets of said first and second passages in said module, said mandrel having a plurality of said holes on the circumference thereof to communicate respectively with said first passages.

3. A reverse osmosis separation apparatus according to claim 1, wherein said membrane sheets and said spacing layers at the opposite spiral edges thereof are held together with said mandrel in a rigid state by means of sealing members, said sealing members respectively forming the opposite ends of said module.

4. A reverse osmosis separation apparatus according to claim 1, wherein said module is covered circumferentially with a cylindrical filter for said feeding solution.

* * * * *